(12) United States Patent
Abari

(10) Patent No.: US 12,386,070 B2
(45) Date of Patent: *Aug. 12, 2025

(54) SYSTEMS AND METHODS FOR LINEARIZING NON-LINEAR CHIRP SIGNALS

(71) Applicant: Pony AI Inc., Grand Cayman (KY)

(72) Inventor: Cyrus F. Abari, San Bruno, CA (US)

(73) Assignee: Pony AI Inc., Grand Cayman (KY)

( * ) Notice: Subject to any disclaimer, the term of this patent is extended or adjusted under 35 U.S.C. 154(b) by 171 days.

This patent is subject to a terminal disclaimer.

(21) Appl. No.: 18/449,515

(22) Filed: Aug. 14, 2023

(65) Prior Publication Data

US 2023/0384451 A1     Nov. 30, 2023

Related U.S. Application Data

(63) Continuation of application No. 17/039,127, filed on Sep. 30, 2020, now Pat. No. 11,726,206.

(51) Int. Cl.
| | |
|---|---|
| *G01C 3/08* | (2006.01) |
| *G01S 7/481* | (2006.01) |
| *G01S 7/4911* | (2020.01) |
| *G01S 17/34* | (2020.01) |

(52) U.S. Cl.
CPC ............ *G01S 17/34* (2020.01); *G01S 7/4818* (2013.01); *G01S 7/4911* (2013.01)

(58) Field of Classification Search
CPC ....... G01S 17/34; G01S 7/4818; G01S 7/4911
See application file for complete search history.

(56) References Cited

U.S. PATENT DOCUMENTS

| | | |
|---|---|---|
| 6,606,052 B1 | 8/2003 | Miyahara |
| 11,726,206 B2* | 8/2023 | Abari ...................... G01S 17/34 |
| | | 356/5.09 |
| 2013/0234880 A1 | 9/2013 | Lee et al. |
| 2016/0299228 A1* | 10/2016 | Maleki ..................... G01S 17/89 |
| 2019/0018110 A1 | 1/2019 | Kremer et al. |
| 2020/0011994 A1* | 1/2020 | Thorpe ................... G01S 17/34 |
| 2021/0026014 A1 | 1/2021 | Horn |
| 2021/0190926 A1 | 6/2021 | Schmalenberg et al. |
| 2022/0268929 A1 | 8/2022 | Hariyama et al. |

* cited by examiner

*Primary Examiner* — Mark Hellner
(74) *Attorney, Agent, or Firm* — Sheppard Mullin Richter & Hampton LLP; Xin Xie

(57) ABSTRACT

A light detection and ranging (LiDAR) sensor is described herein. The LiDAR sensor can comprise a fiber optic ending, a laser assembly, and one or more processors. The fiber optic ending can comprise a fiber optic cable terminated by a reflector. The laser assembly can emit a chirp signal to detect an object in an environment. A portion of the chirp signal can be diverted to the fiber optic ending. The one or more processors construct a profile of the chirp signal based on the diverted portion of the chirp signal. The one or more processors determine a best fit curve based on the profile of the chirp signal and one or more parameters associated with the best fit curve. A frequency offset between an emitted chirp signal and a returned chirp signal can be computed based on the best fit curve and the one or more parameters. Based on the frequency offset, the one or more processors can determine a range of the object.

20 Claims, 6 Drawing Sheets

500

```
┌─────────────────────────────────────────────────────────────┐
│ Divert a portion of an non-linear chirp signal to an fiber optic ending, │
│ wherein the non-linear chirp signal is to be emitted by a LiDAR sensor to │
│           detect an object in an environment                │
│                          502                                │
└─────────────────────────────────────────────────────────────┘
                              │
                              ▼
┌─────────────────────────────────────────────────────────────┐
│ Receive the portion of the non-linear chirp signal reflected from the fiber │
│                      optic ending                           │
│                          504                                │
└─────────────────────────────────────────────────────────────┘
                              │
                              ▼
┌─────────────────────────────────────────────────────────────┐
│ Construct a profile of the non-linear chirp signal based on the portion of │
│  the non-linear chirp signal received from the fiber optic ending │
│                          506                                │
└─────────────────────────────────────────────────────────────┘
                              │
                              ▼
┌─────────────────────────────────────────────────────────────┐
│ Determine a best fit curve based on the profile of the non-linear chirp │
│  signal and one or more parameters associated with the best fit curve │
│                          508                                │
└─────────────────────────────────────────────────────────────┘
                              │
                              ▼
┌─────────────────────────────────────────────────────────────┐
│ Linearize the non-linear chirp signal based on the best fit curve and the │
│                  one or more parameters                     │
│                          510                                │
└─────────────────────────────────────────────────────────────┘
```

FIGURE 5

SYSTEMS AND METHODS FOR LINEARIZING NON-LINEAR CHIRP SIGNALS

CROSS-REFERENCE TO RELATED APPLICATIONS

This application is a continuation of U.S. patent application Ser. No. 17/039,127, filed Sep. 30, 2020, and entitled "SYSTEMS AND METHODS FOR LINEARIZING NON-LINEAR CHIRP SIGNALS," which is incorporated herein by reference in its entirety.

FIELD OF THE INVENTION

The present disclosure relates to light detection and ranging (LiDAR) sensors. More particularly, the present disclosure relates to systems and methods of linearizing non-linear chirp signals associated with LiDAR sensors.

BACKGROUND

A vehicle such as an autonomous or semi-autonomous vehicle can include myriad of sensors that can provide continuous stream of sensor data captured from a surrounding environment of the vehicle. For example, an autonomous or semi-autonomous vehicle can include cameras, light detection and ranging (LiDAR) sensors, radars, Global Positioning System (GPS) devices, sonar-based sensors, ultrasonic sensors, accelerometers, gyroscopes, magnetometers, inertial measurement units (IMUs), far infrared (FIR) sensors, etc. Such sensor data can enable an autonomous vehicle to perform a number of driving functions that would otherwise be performed by a human operator. These driving functions, for example, can include various vehicle navigation tasks such as vehicle acceleration and deceleration, vehicle braking, vehicle lane changing, adaptive cruise control, blind spot detection, rear-end radar for collision warning or collision avoidance, park assisting, cross-traffic monitoring, emergency braking, automated distance control, and the like.

In general, LiDAR sensors used today are based on time of flight principles. In time of flight principles, time differences between emitted laser pulses and returned laser pulses can be measured or determined. Ranges (e.g., distances) of objects in an environment can be determined based on these time differences. Such LiDAR sensors have several disadvantages. For example, a LiDAR sensor based on time of flight principles cannot simultaneously determine ranges and velocities of objects in an environment—it can only determine ranges of objects. Further, laser pulses emitted from the LiDAR sensor can be subjected to interference from other light sources such as sun light, and thereby affecting accuracy of range determination.

LiDAR sensors based on Frequency Modulated Continuous Wave (FMCW) principles or FMCW LiDAR sensors have been developed to address the disadvantages of LiDAR sensors based on time of flight principles. In FMCW LiDAR sensors, instead of a pulse, a constant varying frequency signal (i.e., a chirp signal) is emitted and returned. A frequency offset between an emitted chirp signal and a returned chirp signal can be computed and used to determine a range (e.g., a distance) of an object in an environment. In addition, a velocity of the object can be simultaneously determined by the FMCW LiDAR sensors using doppler effect principles.

One drawback associated with FMCW LiDAR sensors is that a chirp signal required for determining a range and velocity of an object needs to be a linear constant varying frequency signal (e.g., a linear chirp signal). That is, frequency of a chirp signal needs to vary linearly with a time duration of the chirp signal. Such a linear chirp signal is needed to accurately and reliably determine a range and velocity of an object. In today's laser technology, a laser source capable of producing such a linear chirp signal can be cost prohibitive to be widely implemented in FMCW LiDAR sensors. Most of commercially available laser sources today are non-linear laser sources that produce non-linear chirp signals, which cannot be reliably used in FMCW LiDAR sensors to determine a range and velocity of an object. Described herein are technical solutions that can compensates non-linear chirp signals such non-linear laser sources can be used in FMCW LiDAR sensors.

SUMMARY

A light detection and ranging (LiDAR) sensor is described herein. In various embodiments, the LiDAR sensor can comprise a fiber optic ending, a laser assembly, and one or more processors. The fiber optic ending can comprise a fiber optic cable terminated by a reflector. The laser assembly can emit a chirp signal to detect an object in an environment. A portion of the chirp signal can be diverted to the fiber optic ending. The one or more processors construct a profile of the chirp signal based on the diverted portion of the chirp signal. The one or more processors determine a best fit curve based on the profile of the chirp signal and one or more parameters associated with the best fit curve. A frequency offset between an emitted chirp signal and a returned chirp signal can be computed based on the best fit curve and the one or more parameters. Based on the frequency offset, the one or more processors determine a range of the object.

In some embodiments, the fiber optic cable has a length of at least a detection range of the LiDAR sensor.

In some embodiments, the reflector can reflect the diverted portion of the chirp signal back to the laser assembly through the fiber optic cable.

In some embodiments, the laser assembly can comprise a frequency modulator, a laser frequency detector, a laser transceiver, and an optical circulator. The frequency modulator can be configured to generate the chirp signal based on a pulse from a laser source. The laser frequency detector can be configured to detect frequency of the diverted portion of the chirp signal reflected from the fiber optic ending. The laser transceiver can be configured to emit the chirp signal received from the frequency modulator. The optical circulator can optically couple the frequency modulator to the laser transceiver and the fiber optic ending to the laser frequency detector.

In some embodiments, the frequency modulator can comprise a local oscillator and the frequency modulator can generate the chirp signal by mixing the pulse with frequency of the local oscillator.

In some embodiments, the local oscillator can be a voltage controlled local oscillator.

In some embodiments, the profile of the chirp signal can be constructed based on the frequency of the diverted portion of the chirp signal detected by the laser frequency detector.

In some embodiments, the best fit curve can comprise at least one of an exponential curve, a polynomial curve, a logarithmic curve, or a combination of the exponential curve, the polynomial curve, and the logarithmic curve.

In some embodiments, the one or more parameters can comprise at least a y-intercept associated with the best fit curve.

In some embodiments, the one or more processors can be further configured to determine a time at which the chirp signal is received by the LiDAR sensor and the time at which the chirp signal is received can be substituted into the best fit curve to determine the frequency offset.

These and other features of the apparatus disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the inventions.

BRIEF DESCRIPTION OF THE DRAWINGS

Certain features of various embodiments of the present inventions are set forth with particularity in the appended claims. A better understanding of the features and advantages of the inventions will be obtained by reference to the following detailed description that sets forth illustrative embodiments, in which the principles of the invention are utilized, and the accompanying drawings of which:

FIG. 5 illustrates an example method in accordance with various embodiments of the present invention.

Figure 1:
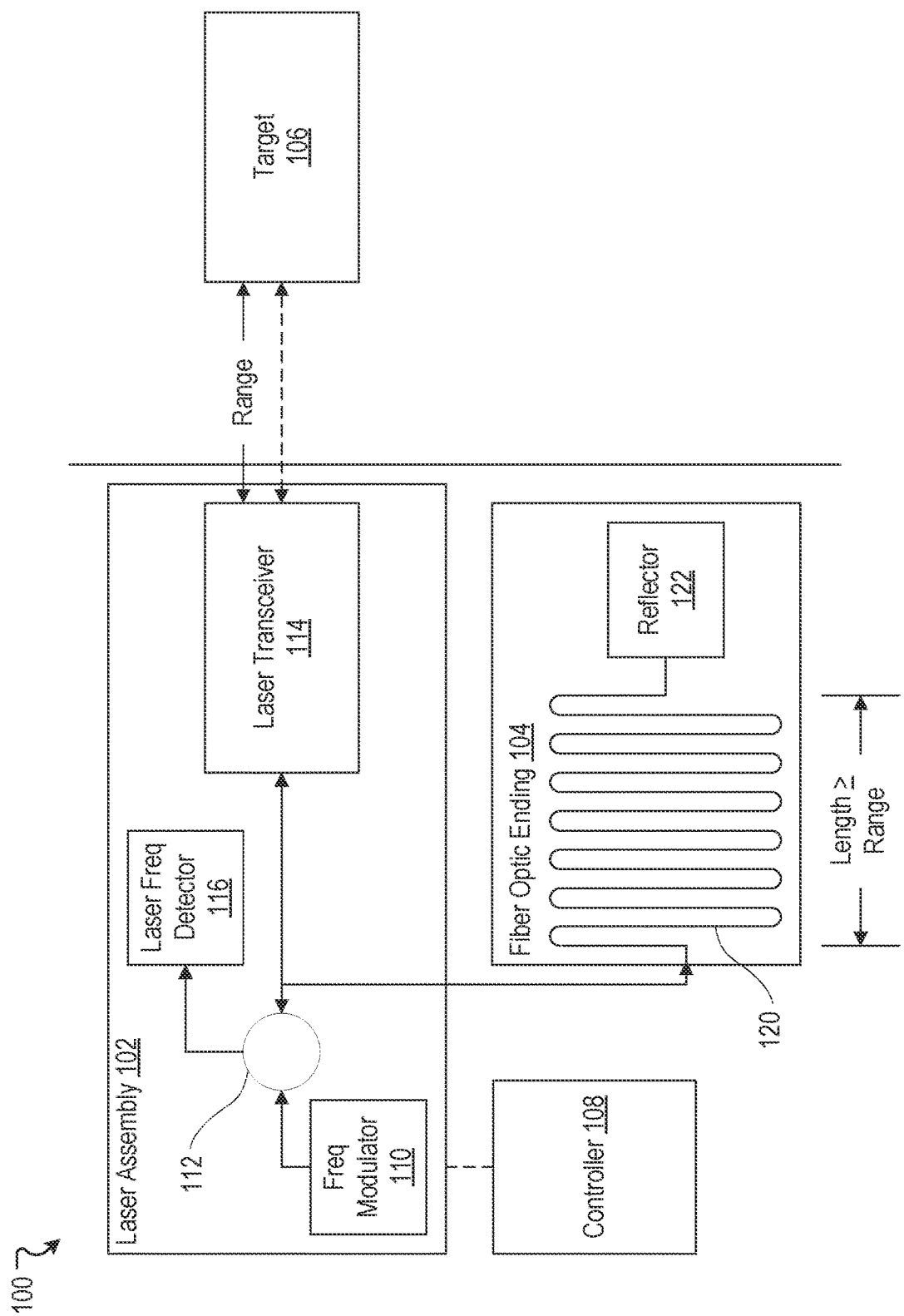
FIG. 1 illustrates an example LiDAR sensor in accordance with various embodiments of the present invention.

The figures depict various embodiments of the disclosed apparatus for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

In the following description, certain specific details are set forth in order to provide a thorough understanding of various embodiments of the invention. However, one skilled in the art will understand that the invention may be practiced without these details. Moreover, while various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way.

Unless the context requires otherwise, throughout the present specification and claims, the word "comprise" and variations thereof, such as, "comprises," "comprising," "includes," "including," "contains," or "containing" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents and vice versa unless the context clearly dictates otherwise. The phrases "at least one of," "at least one selected from the group of," or "at least one selected from the group consisting of," and the like are to be interpreted in the disjunctive (e.g., not to be interpreted as at least one of A and at least one of B).

Reference throughout this specification to "some embodiments" or "various embodiments" means that a particular feature, structure or characteristic described in connection with the embodiment is included in at least one embodiment of the present invention. Thus, the appearances of the phrases "in some embodiments" or "in various embodiments" in various places throughout this specification are not necessarily all referring to the same embodiment, but may be in some instances. Furthermore, the particular features, structures, or characteristics may be combined in any suitable manner in one or more embodiments.

A vehicle such as an autonomous or semi-autonomous vehicle can include myriad of sensors that can provide continuous stream of sensor data captured from a surrounding environment of the vehicle. For example, an autonomous or semi-autonomous vehicle can include cameras, light detection and ranging (LiDAR) sensors, radars, Global Positioning System (GPS) devices, sonar-based sensors, ultrasonic sensors, accelerometers, gyroscopes, magnetometers, inertial measurement units (IMUs), far infrared (FIR) sensors, etc. Such sensor data can enable an autonomous vehicle to perform a number of driving functions that would otherwise be performed by a human operator. These driving functions, for example, can include various vehicle navigation tasks such as vehicle acceleration and deceleration, vehicle braking, vehicle lane changing, adaptive cruise control, blind spot detection, rear-end radar for collision warning or collision avoidance, park assisting, cross-traffic monitoring, emergency braking, automated distance control, and the like.

LiDAR sensors used today are based on time of flight principles. In time of flight principles, time differences between emitted laser pulses and returned laser pulses can be measured. Ranges (e.g., distances) of objects in an environment can be determined based on these time differences. For example, time at which a LiDAR sensor emits a laser pulse is known or can be determined. Similarly, time the which the LiDAR sensor receives the laser pulse is also known or can be determined. A distance (e.g., a range) that the laser pulse traveled can be readily calculated by multiplying speed of light (i.e., speed at which the laser pulse traveled) by the time difference between the time the laser pulse was emitted and the time the laser pulse was received. Such LiDAR sensors have several disadvantages. For example, a LiDAR sensor based on time of flight principles cannot simultaneously determine ranges and velocities of objects in an environment—it can only determine ranges of objects. Further, laser pulses emitted from the LiDAR sensor can be subjected to interference from other light sources such as sun light, and thereby affecting accuracy of range determination.

LiDAR sensors based on Frequency Modulated Continuous Wave (FMCW) principles or FMCW LiDAR sensors have been developed to address the disadvantages of LiDAR sensors based on time of flight principles. In FMCW LiDAR sensors, instead of a pulse, a constant varying frequency signal (e.g., a chirp signal) is emitted and returned. A frequency offset between an emitted chirp signal and a returned chirp signal can be computed and used to determine a range (e.g., a distance) of an object in an environment. In addition, a velocity of the object can be simultaneously determined by the FMCW LiDAR sensors using doppler effect principles. For example, if an object is moving away from a FMCW LiDAR sensor, a chirp signal reflected off from the object would have a frequency that is slight lower (e.g., elongated frequency) than the frequency at which the chirp signal was emitted. On the other hand, if an object is moving toward a FMCW LiDAR sensor, a chirp signal reflected off from the object would have a frequency that is slightly higher (e.g., compressed frequency) than the frequency at which the chirp signal was emitted. In general, a chirp signal is more immune to interferences than a pulse signal because the chirp signal operates based on frequencies and thus is less immune to amplitude interference from bright light sources such as sun light.

One drawback associated with FMCW LiDAR sensors is that a chirp signal required for determining a range and velocity of an object needs to be a linear constant varying frequency signal (e.g., a linear chirp signal). That is, frequency of a chirp signal needs to vary linearly with a time duration (e.g., a pulse duration or a pulse width) of the chirp signal. Such a linear chirp signal is needed to accurately and reliably determine a range and velocity of an object. In today's laser technology, a laser source capable of producing such a linear chirp signal can be cost prohibitive to be widely implemented in FMCW LiDAR sensors. Most of commercially available laser sources today are non-linear laser sources that produce non-linear chirp signals, which cannot be reliably used in FMCW LiDAR sensors to determine a range and velocity of an object.

A solution rooted in technology, described herein, addresses the problems discussed above. In various embodiments, a LiDAR sensor such as a FMCW LiDAR sensor can comprise a sensor housing that includes a transparent window. The sensor housing can further include a laser assembly that includes a laser source (e.g., a non-linear laser source) mounted on a rotating platform that can rotate at various rotational speeds. The laser source can emit constant varying frequency signals (e.g., chirp signals) through the transparent window to an environment outside of the LiDAR sensor. The chirp signals can reflect off from objects in the environment and return to the laser assembly through the transparent window. The laser assembly can include a laser frequency detector that detects the returned chirp signals. Based on frequency offsets between the emitted and the returned chirp signals, ranges and velocities of objects in the environment can be determined.

In some embodiments, the laser assembly can further include a frequency modulator that modulates a laser pulse to a constant varying frequency signal (e.g., a chirp signal). This chirp signal can be outputted to a laser transceiver of the laser assembly through an optical circulator. The laser transceiver can emit the chirp signal to an environment and receive the chirp signal reflected from an object in the environment. As discussed, a chirp signal can be a non-linear chirp signal when a laser source used in the LiDAR sensor is a non-linear laser source. In some embodiments, a portion of a non-linear chirp signal can be diverted from the optical circulator to a fiber optic ending while the remaining portion of the non-linear chirp signal is outputted to the laser transceiver to be emitted to the environment. The fiber optic ending, in some embodiments, comprises a fiber optic cable with a first ending optically coupled to the optical circulator and a second ending optically terminated to a reflector. The reflector can reflect the diverted portion of the non-linear chirp signal back to the laser frequency detector through the fiber optic cable and the optical circulator. The laser frequency detector can determine frequency data associated with the diverted portion of the non-linear chirp signal. Based on the frequency data, a profile (e.g., a curvature) of the non-linear chirp signal can be constructed. Based on the profile, a mathematical equation that characterizes the profile (e.g., a best fit curve) and one or more parameters associated with the mathematical equation can be determined or derived. The mathematical equation and the associated one or more parameters can be used to linearize the non-linear chirp signal. Once the non-linear chirp signal is linearized, a frequency offset between an emitted non-linear chirp signal and a returned non-linear chirp signal can be computed. Because a range of an object is directly proportional to a frequency offset between an emitted chirp signal and a returned chirp which reflected off the object, the range of the object can be determined once the frequency offset is known.

In some embodiments, a length of the fiber optic cable in the fiber optic ending can be sized based on a maximum detection range of a LiDAR sensor. The length of the fiber optic cable can be sized such that the length is at least greater than or equal to the maximum detection range of the LiDAR sensor. This is because a diverted portion of a non-linear chirp signal needs to travel the same distance (e.g., the maximum detection range) as the undiverted portion of the non-linear chirp signal would in an environment in order to accurately characterize non-linearity (e.g., a profile) of the non-linear chirp signal. These and other aspects of the invention will be discussed in greater detail in reference to FIG. 1 below.

FIG. 1 illustrates an example LiDAR sensor 100 in accordance with various embodiments of the present invention. In some embodiments, the LiDAR sensor 100 can be a frequency modulated continuous wave (FMCW) LiDAR sensor. The LiDAR sensor 100 can include a laser assembly 102, a fiber optic ending 104, and a controller 108 which may comprise one or more processors configured to control various components of the laser assembly 102. The LiDAR sensor 100 can detect a target 106 and determine a range (e.g., distance) of the target 106 in an environment outside of the LiDAR sensor 100.

In some embodiments, the laser assembly 102 can include a frequency modulator 110, an optical circulator 112, a laser transceiver 114, and a laser frequency detector 116. The frequency modulator 110 can modulate a laser pulse from a laser source (not shown) into a constant varying frequency signal (e.g., a chirp signal). The frequency modulator 110 can modulate the laser pulse into the constant varying frequency signal by mixing the laser pulse with frequencies from a local oscillator. In some embodiments, the local oscillator can be a voltage controlled local oscillator in which frequency of the voltage controlled local oscillator vary in accordance with an input voltage to the voltage controlled local oscillator. Depending on the laser source used in the laser assembly 102, a chirp signal can be either linear or non-linear. For example, if a laser source is a non-linear laser source, a chirp signal generated by the frequency modulator 110 is non-linear. On the other hand, if a laser source is a linear laser source, a chirp signal generated by the frequency modulator 110 is linear.

In some embodiments, the frequency modulator 110 can be optically coupled to an input port of the optical circulator 112. In general, an optical circulator is a three port optical device designed such that light signals (e.g., a non-linear chirp signal) entering an input port exits a first output port. Any light signals reflected (e.g., coming back) in the first output port are directed to a second output port instead of the input port of the optical circulator. In this way, any reflected light signals do not interfere with light signals at the input port of the optical circulator. In some embodiments, a first output of the optical circulator 112 can be optically coupled to the laser transceiver 114 and a second output of the optical circulator 112 can be optically coupled to the laser frequency detector 116. In such embodiments, a non-linear (or linear) chirp signal from the frequency modulator 110 can be outputted to the laser transceiver 114 through the optical circulator 112 via an optical path of from the input port to the first output port of the optical circulator 112. The non-linear chirp signal is then emitted to the target 106 by the laser transceiver 114 (e.g., indicated by a dash line from the laser transceiver 114 to the target 106 in FIG. 1). The non-linear chirp signal reflected from the target 106 can be returned to the laser transceiver 114. This returned non-linear chirp signal is subsequently received by the laser frequency detector 116 through the optical circulator 112 via an optical pathway of from the first output to the second output of the optical circulator 112. Time at which the returned non-linear chirp signal is received or detected by the laser frequency detector 116 can be determined by the controller 108. For example, the controller 108 can record timestamp data at which a chirp signal is received or detected by the laser frequency detector 116.

In some embodiments, the fiber optic ending 104 can include a fiber optic cable 120 and a reflector 122. In various embodiments, the fiber optic cable 120 can be any suitable fiber optic cable optically matched to a frequency of the laser source of the laser assembly 102. For example, if a laser source outputs a laser light in 500 to 600 nanometers of wavelength, a fiber optic cable suitable to carry light in the 500 to 600 nanometers of wavelength can be used in the fiber optic ending 104. As another example, if a laser source outputs a laser light in 1000 to 1600 nanometers of wavelength, a fiber optic cable suitable to carry light in the 1000 to 1600 nanometers of wavelength can be used in the fiber optic ending 104. In some embodiments, a first end of the fiber optic cable 120 can be optically coupled to the first output of the optical circulator 112 and a second end of the fiber optic cable 120 can be optically terminated by the reflector 122. In various embodiments, the reflector 122 can be a mirror or any other suitable material capable of reflecting light carried by the fiber optic cable 120.

In some embodiments, a portion of the non-linear chirp signal from the first output of the optical circulator 112 can be diverted into the fiber optic cable 120 of the fiber optic ending 104 through an optical splitter (not shown), while the remaining portion of the non-linear chirp signal form the first output of the optical circular 112 is outputted to the laser transceiver 114 to be emitted to the target 106. This diverted portion of the non-linear chirp signal can travel through a length of the fiber optic cable 120 to the reflector 122. The reflector 122 reflects the diverted portion of the non-linear chirp signal back to laser assembly 102 and to the laser frequency detector 116 through the optical circulator 112. The laser frequency detector 116 can determine frequency data associated with the diverted portion of the non-linear chirp signal. For example, the laser frequency detector 116 can include one or more analog-to-digital converters that convert frequency of a signal detected into frequency data. This frequency data, in some embodiments, can be used to construct a profile of the non-linear chirp signal. For example, a profile of a chirp signal can be constructed by plotting frequency data over pulse width (i.e., time) of the chirp signal. In some embodiments, a best fit curve can be determined based on the profile of the non-linear chirp signal. From the best fit curve, a mathematical equation and one or more parameters associated with the mathematical equation can derived. The mathematical equation and the one or more parameters can be applied to linearize the non-linear chirp signal so a frequency offset between an emitted non-linear chirp signal and a returned non-linear chirp signal can determined. A range of the target 106 can be determined based on the frequency offset. The linearization or correction of a non-linear chirp signal will be discussed in greater detail in reference to FIG. 2 below.

In some embodiments, a length of the fiber optic cable 120 can vary based on a maximum detection range of the LiDAR sensor 100. Such variations in the length of the fiber optic cable 120 are needed to properly characterize a non-linear chirp signal. For example, a FMCW LiDAR may have a maximum detection range of 300 meters. In this example, the length of the fiber optic cable 120 needs to be at least 300 meters in order to properly characterize various signal characteristics associated with a non-linear chirp signal travelling forward and back 300 meters. For instance, frequency and amplitude attenuations associated with a non-linear chirp signal may vary depending on a distant the non-linear chirp signal travels. Therefore, by having a fiber optic cable equaling at least a maximum detection range of a FMCW LiDAR sensors, various signal characteristics of chirp signals can be properly characterized.

In some embodiments, the fiber optic ending 104 can be modular. For example, the fiber optic ending 104 can be fitted with different lengths of fiber optic cables based on a type of LiDAR sensor. For example, if a first FMCW LiDAR sensor has a maximum detectable range of 200 meters, a fiber optic ending having a fiber optic cable of at least 200 meters can be used to characterize non-linear chirp signals from the first FMCW LiDAR sensor. As another example, if a second FMCW LiDAR sensor has a maximum detectable range of 500 meters, a fiber optic ending having a fiber optic cable of at least 500 meters can be used to characterize non-linear chirp signals from the second FMCW LiDAR sensor. In this example, a fiber optic cable of 200 meter would not be ideal in characterizing the non-linear chirp signals emitted from the second FMCW LiDAR sensor because attenuations of a non-linear chirp signal travelling forward and back 500 meters may be different than a non-linear chirp signal travelling forward and back 200 meters. As such, a selection of the fiber optic ending 104 to match a maximum detection range of the LiDAR sensor 100 is important in characterizing non-linear chirp signals emitted from the LiDAR sensor 100.

In some embodiments, the controller 108 can be configured for control various components of the laser assembly 102. For example, the controller 108 can be configured to change frequencies of the local oscillator of the frequency modulator 110 or control operations associated with the laser transceiver 114 and the laser frequency detector 116. For example, the controller 108 may instruct the laser transceiver 114 to emit and receive a chirp signal. As another example, the controller 108 may instruct the laser frequency detector 116 to capture frequency data of a chirp signal. In some embodiments, the controller 108 can be configured to construct a profile of a non-linear chirp signal based on a portion of a non-linear chirp signal diverted into the fiber optic ending 104 and received by the laser frequency detector 116. The controller 108 can determine the profile of the non-linear chirp signal based on frequency data of the portion of the non-linear chirp signal reflected through the fiber optic ending 104 as detected by the laser frequency detector 116. Based on the frequency data, the profile of the non-linear chirp signal can be constructed by the controller 108. In some embodiments, the controller 108 can determine a mathematical equation (e.g., a best fit curve) to model the profile of the non-linear chirp signal. The mathematical equation can be an exponential curve, a polynomial curve, a logarithmic curve, a linear curve, some combinations of the aforementioned curves, or any other suitable curves, for example. In some embodiments, the controller 108 can determine one or more parameters associated with the mathematical equation. The mathematical equation and the one or more parameters can be used to linearize the non-linear chirp signal. The linearization of a non-linear chirp signal is discussed in further detail in reference to FIG. 2 below.

Figure 2:
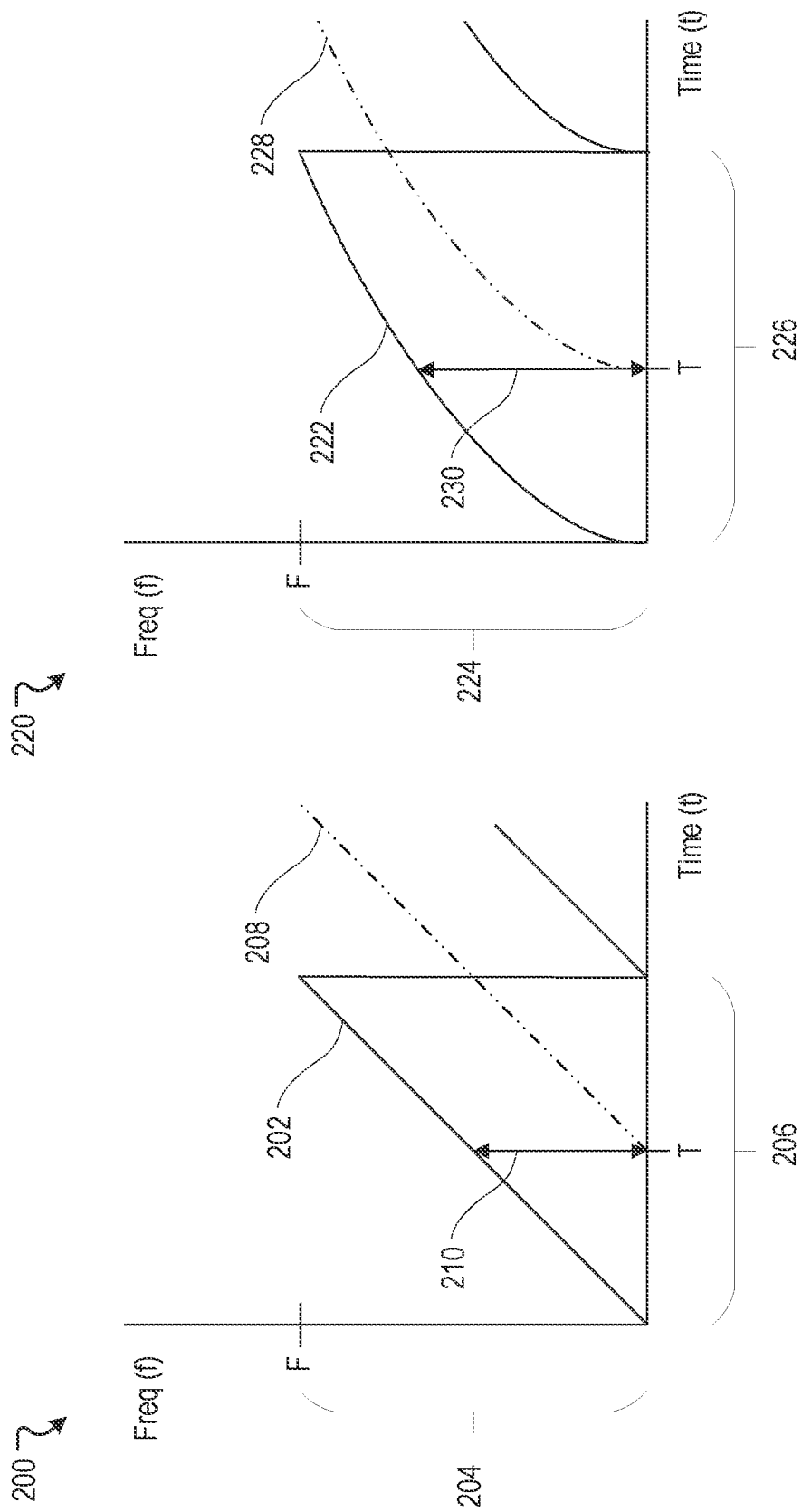
FIG. 2 illustrates example chirp signal graphs in accordance with various embodiments of the present invention.

FIG. 2 illustrates example chirp signal graphs 200, 220 in accordance with various embodiments of the present invention. In some embodiments, a linear chirp signal can be represented by the chirp signal graph 200. The chirp signal graph 200 comprises an x-axis and a y-axis. The x-axis represents time (e.g., "Time(t)") while the y-axis represents frequency (e.g., "Freq(f)"). In some embodiments, the linear chirp signal depicted in the chirp signal graph 200 can comprise a laser pulse 202 (e.g., a sawtooth pulse) in which frequency 204 of the laser pulse 202 increases linearly within a pulse duration 206 of the laser pulse 202 and the laser pulse 202 has a maximum frequency "F." In general, the laser pulse 202 is called a chirp signal because the frequency 204 of the laser pulse 202 resembles that of a bird chirp (i.e., linearly increasing). As discussed with respect to FIG. 1 above, in some embodiments, the laser pulse 202 can be emitted to a target (e.g., the target 106 in FIG. 1). The laser pulse 202 reflected from the target can be represented by a returned laser pulse 208 in the chirp signal graph 200. The returned laser pulse 208 can be detected or captured by a laser frequency detector (e.g., the laser frequency detector 116 in FIG. 1) at time "T." As depicted in the chirp graph 200, the laser pulse 202 and the returned laser pulse 208 can have a frequency offset 210. This frequency offset 210 is constant and is proportional to a range (e.g., distance) of the target. The frequency offset 210 can be readily calculated when a chirp signal is linear. For example, the laser pulse 202 can be approximated or modeled as a linear curve (e.g., a best fit curve) with a mathematical equation f(x)=mx+b, where m is a slope, b is a y-intercept, and x is a variable representing time. In this example, the y-intercept is zero, therefore, the frequency offset 210 can be determined by substituting T into x—i.e., the frequency offset 210 can be computed by multiplying m by T. Because the laser pulse 202 is a linear chirp signal, the slope m of the laser pulse 202 can be calculated by simply dividing F by the pulse duration 206 (e.g., rise over run). As such, a range of a target can be easily determined by using a linear chirp signal because a frequency offset between an emitted chirp signal and a returned chirp signal can be readily computed based on a maximum frequency of the emitted chirp signal and time at which the returned chirp signal is detected.

In some embodiments, a non-linear chirp signal can be represented by the chirp signal graph 220. Similar to the chirp graph 200, the chirp signal graph 220 comprises an x-axis and a y-axis. The x-axis represents time (e.g., "Time(t)") while the y-axis represents frequency (e.g., "Freq(f)"). In some embodiments, the non-linear chirp signal depicted in the chirp signal graph 220 can comprise a laser pulse 222 in which frequency 224 of the laser pulse 222 does not increase linearly within a pulse duration 226 of the laser pulse 222 and the laser pulse 222 has a maximum frequency "F." As discussed with respect to FIG. 1 above, in some embodiments, the laser pulse 222 can be emitted to a target (e.g., the target 106 in FIG. 1). The laser pulse 222 reflected from the target can be represented by a returned laser pulse 228 in the chirp signal graph 220. The returned laser pulse 228 can be detected or captured by a laser frequency detector (e.g., the laser frequency detector 116 in FIG. 1) at time "T." However, unlike the case with the linear chirp signal discussed above, because a profile (e.g., a curvature) of the laser pulse 222 is non-linear, a frequency offset 230 between the laser pulse 222 and the returned laser pulse 228 cannot be readily determined based on a slope of the laser pulse 222. As such, a range of the target cannot be reliably or readily calculated. Therefore, to determine the range of the target, the laser pulse 222 needs to be linearized.

One such linearization technique involves generating a reference chirp signal associated with a non-linear chirp signal. As used here and elsewhere in this document, "linearize" and/or "linearization" refer to a process of determining a best fit curve (e.g., a mathematical equation) and determining one or more parameters (e.g., values, numbers, etc.) associated with the best fit curve for a non-linear chirp signal. In some embodiments, a reference chirp signal can be a signal diverted from a non-linear chirp signal. This diverted signal can be used to characterize a profile (e.g., curvature) of the non-linear chirp signal. Referring back to FIG. 2, the profile of the laser pulse 222 can determined based on a signal diverted from the laser pulse 222 (e.g., the diverted portion of the non-linear chirp signal travelling through the fiber optic ending 104 discussed in reference to FIG. 1). The frequency offset 230 can be determined based on the profile of the laser pulse 222. For example, the profile of the laser pulse 222 can be approximated or modeled as a logarithmic curve (e.g., a best fit curve) with a mathematical equation $f(x)=\log_2(x+1)+b$, where b is a y-intercept, and x is a variable representing time. In this example, the y-intercept is zero, therefore, the frequency offset 230 can be determined by substituting T into x—i.e., the frequency offset 230 can be computed by $\log_2(T+1)$. Accordingly, the range of the target thus can be determined based on the frequency offset 230 because the range of the target is proportional to the frequency offset 230.

Now referring back to FIG. 1., a portion of a non-linear chirp signal from frequency modulator 110 can be diverted into the fiber optic ending 104 through the optical circulator 112. This diverted portion of the non-linear chirp signal can travel through the length of the fiber optic cable 120 and reflect, through the reflector 122, back to the laser frequency detector 116. The controller 108 can determine a profile of the non-linear chirp signal based on frequency data of the diverted portion of the non-linear chirp signal as detected or observed by the laser frequency detector 112. The controller 108 can construct a profile associated with the non-linear chirp signal based on the frequency data of the diverted portion of the non-linear chirp signal. Based on this profile, the controller 108 can determine a best fit curve and one or more parameters for the best fit curve for the non-linear chirp signal such that a frequency offset between an emitted non-linear chirp signal and a received non-linear chirp can be computed and a range of the target 106 can be correspondingly determined based on the frequency offset.

In some embodiments, non-linear chirp signals emitted by the laser assembly 102 to the target 106 may vary from one chirp signal to a next chirp signal. For example, a first non-linear chirp signal emitted by the laser assembly 102 may have a profile (e.g., a curvature) that is different from a second non-linear chirp signal emitted by the laser assembly 102. For example, the first non-linear chirp signal may have a parabolic or exponential profile and the second non-linear chirp signal may have a logarithmic profile. As such, to properly correct for non-linearity of non-linear chirp signals, each non-linear chirp signal needs to be observed, characterized, and ultimately linearized on a signal-by-signal basis.

Figure 3:
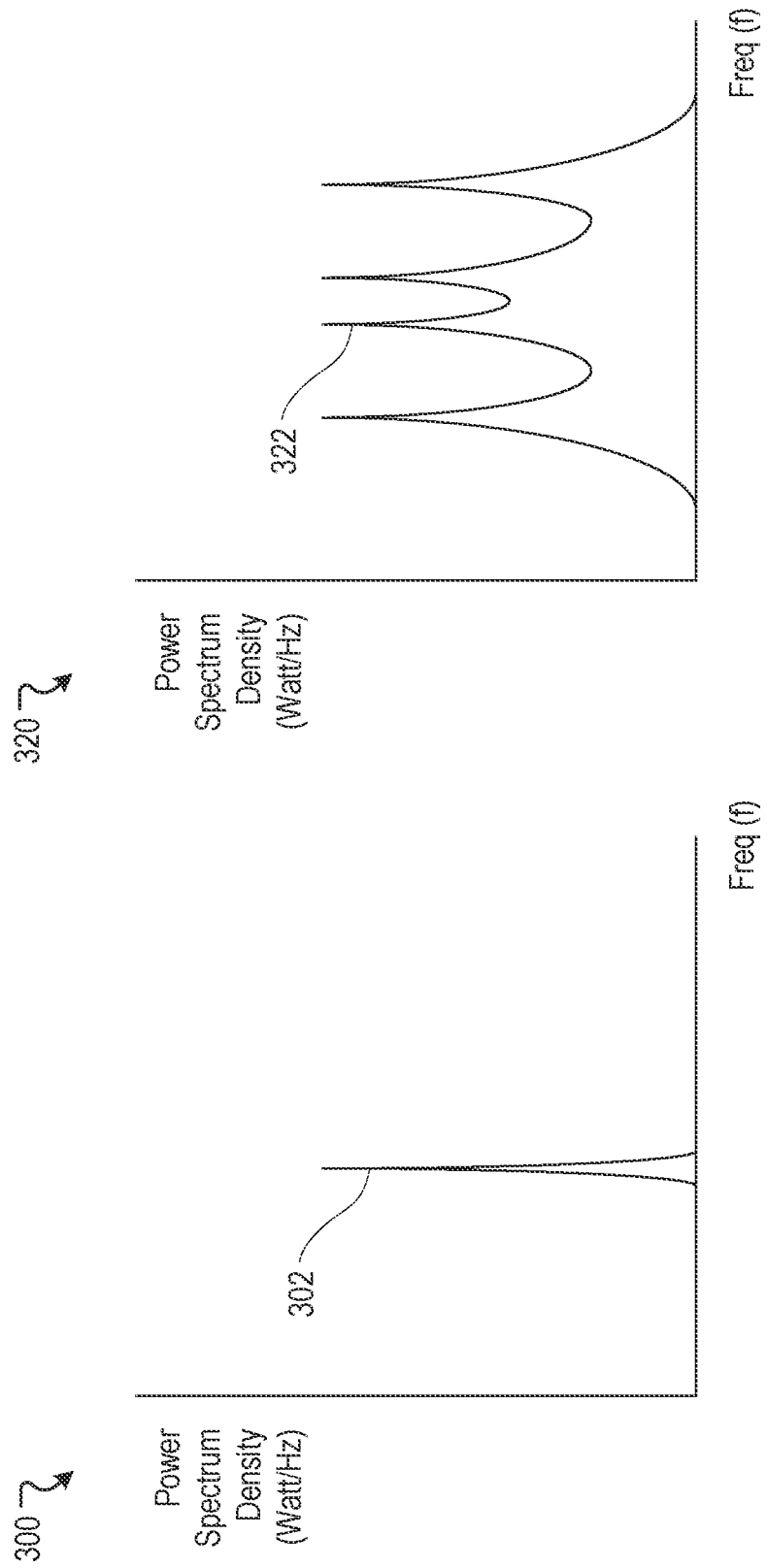
FIG. 3 illustrates example power spectrum density graphs in accordance with various embodiments of the present invention.

FIG. 3 illustrates example power spectrum density graphs 300, 320 in accordance with various embodiments of the present invention. The power spectrum density graphs 300, 320 each comprises an x-axis and a y-axis. The x-axis represents frequency components of a chirp signal (e.g., "Freq(f)") while the y-axis represents signal power of the chirp signal (e.g., "Power Spectrum Density (Watt/Hz)"). In some embodiments, a chirp signal can be transformed from time domain to frequency domain by applying Fourier transformation and represent the chirp signal in the frequency domain. The power spectrum density graph 300 shows a power spectrum 302 corresponding to a frequency offset between an emitted linear chirp signal and a returned linear chirp signal. Because this frequency offset is constant for linear chirp signals, the power spectrum 302 thus has a single peak. In contrast, the power spectrum density graph 320 shows a power spectrum 322 corresponding to a frequency offset between an emitted non-linear chirp signal and a returned non-linear chirp signal. Unlike the frequency offset for linear chirp signal, here, because the frequency offset is not constant, the power spectrum 322 has multiple peaks.

Figure 4:
FIG. 4 illustrates an example signal linearization system in accordance with various embodiments of the present invention.

FIG. 4 illustrates an example signal linearization system 400 in accordance with various embodiments of the present invention. The signal linearization system 400 can include a chirp signal linearization engine 402 that can further include one or more processors and memory. The one or more processors, in conjunction with the memory, can be configured to perform various operations associated with the chirp signal linearization engine 402. For example, the one or more processors and the memory can be configured to detect frequency of a non-linear chirp signal to determine a profile (e.g., a curvature) of the non-linear chirp signal. As another example, the one or more processors and the memory can be configured to determine a best fit curve for the profile of the non-linear chirp signal and determine one or more parameters associated with the best fit curve. As shown in FIG. 4, the chirp signal linearization engine 402 can include a non-linearity characterization engine 404 and a linearization engine 406.

In some embodiments, the signal linearization system 400 can additionally include at least one data store 420 that is accessible to the chirp signal linearization engine 402. In some embodiments, the data store 420 can be configured to store parameters, data, configuration files, or machine-readable codes of the non-linearity characterization engine 404 and the linearization engine 406.

In various embodiments, the chirp signal linearization engine 402 can be configured to characterize non-linearity (e.g., a profile) of a chirp signal such that the chirp signal can be linearized. As used here and elsewhere in this document, "linearize" and/or "linearization" refer to a process of determining a best fit curve (e.g., a mathematical equation) and determining one or more parameters (i.e., values, numbers, etc.) associated with the best fit curve for a chirp signal. Further, as used here and elsewhere in this document, "characterize" and "characterization" refer to a process of determining a profile (e.g., a curvature) of a non-linear chirp signal.

In some embodiments, the non-linear characterization engine 404 can be configured to characterize non-linearity (e.g., a profile) of a chirp signal. The non-linearity characterization engine 404 can characterize a profile of a chirp signal based on a reference signal. In some embodiments, the reference signal can be a signal diverted from a chirp signal. For example, one percent of a laser chirp signal from a FMCW LiDAR sensor can be diverted to a laser frequency detector and the remaining ninety nine percent of the laser chirp signal can be emitted by the FMCW LiDAR sensor to detect objects in an environment. In this example, the non-linear characterization engine 404 can determine a profile of the laser chirp signal based on the one percent of the laser chirp signal that was diverted to the laser frequency detector. The non-linearity characterization engine 404 can determine a profile of a chirp signal based on frequency data of the reference signal of the chirp signal. Based on the frequency data, the non-linearity characterization engine 404 can construct the profile of the chirp signal. In some embodiments, the non-linearity characterization engine 404 can determine a best fit curve (e.g., a mathematical equation) and one or more parameters associated with the best fit curve based on the profile of the chirp signal. For example, the non-linearity characterization engine 404 can determine that a best fit mathematical equation for a chirp signal is a polynomial curve and accordingly determine a polynomial equation and one or more parameters associated with the polynomial equation that best characterize the chirp signal. The non-linearity characterization engine 404 can provide the best fit curve and the one or more parameters associated with the best fit curve to the linearization engine 406 for further processing.

In some embodiments, the linearization engine 406 can be configured to determine a frequency offset between an emitted chirp signal and a returned chirp signal. The linearization engine 406 can determine time at which the returned chirp signal is received. The linearization engine 406 can determine the frequency offset by substituting the time at which the returned chirp is received to the best fit curve and applying the one or more parameters associated with the best fit curve received from the non-linearity characterization engine 404. For example, a frequency offset between an emitted chirp signal and a returned chirp signal can be computed by substituting a time at which the returned chirp signal is detected to a mathematical equation of a best fit determined for the emitted chirp signal. Once a frequency offset is computed, the linearization engine 406 can determine a range of a target based on the frequency offset.

FIG. 5 illustrates an example method 500 in accordance with various embodiments of the present invention. It should be appreciated that there can be additional, fewer, or alternative steps performed in similar or alternative orders, or in parallel, within the scope of the various embodiments unless otherwise stated.

At block 502, the example method 500 can divert a portion of the non-linear chirp signal to a fiber optic ending, wherein the non-linear chirp signal is to be emitted by the LiDAR sensor to detect an object in an environment. At block 504, the example method 500 can receive the portion of the non-linear chirp signal reflected from the fiber optic ending. At block 506, the example method 500 can construct a profile of the non-linear chirp signal based on the portion of the non-linear chirp signal received from the fiber optic ending. At block 508, the example method 500 can determine a best fit curve based on the profile of the non-linear chirp signal and one or more parameters associated with the best fit curve. At block 510, the example method 500 can linearize the non-linear chirp signal based on the best fit curve and the one or more parameters.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 6:
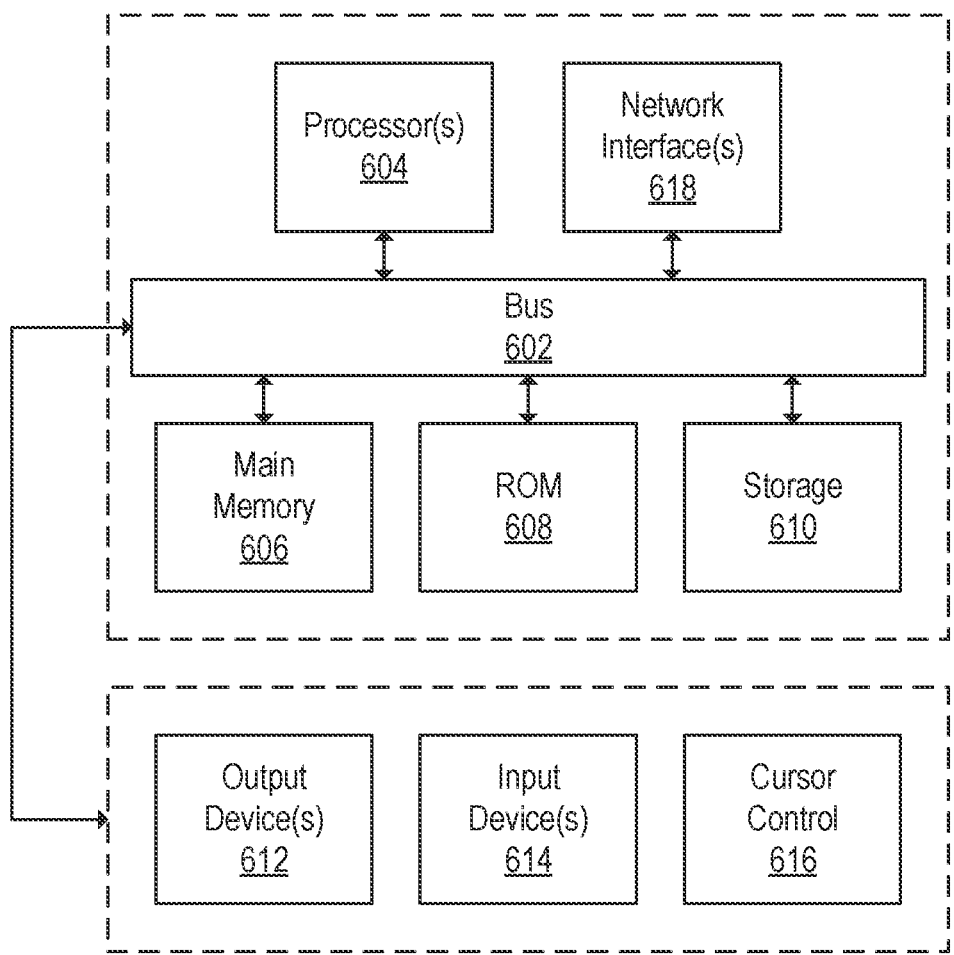
FIG. 6 illustrates a block diagram of a computer system upon which any of the embodiments described herein may be implemented.

FIG. 6 is a block diagram that illustrates a computer system 600 upon which any of the embodiments described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a cathode ray tube (CRT) or LCD display (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

The computer system 600 also includes a communication interface 618 coupled to bus 602. Communication interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to communicated with a WAN). Wireless links may also be implemented. In any such implementation, communication interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet)

and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A light detection and ranging (LiDAR) system comprising:
    a fiber optic ending comprising a fiber optic cable terminated by a reflector;
    a laser assembly that emits a chirp signal to detect an object in an environment, wherein a portion of the chirp signal is diverted to the fiber optic ending; and
    one or more processors configured to:
        determine a profile of the chirp signal based on the diverted portion of the chirp signal; and
        determine a range of the object based on the profile of the chirp signal.

2. The LiDAR system of claim 1, wherein the laser assembly comprises:

a frequency modulator configured to generate the chirp signal based on a pulse from a laser source.

3. The LiDAR system of claim 2, wherein the laser assembly comprises:
a laser frequency detector configured to detect a frequency of the diverted portion of the chirp signal reflected from the fiber optic ending.

4. The LiDAR system of claim 3, wherein the laser assembly comprises:
a laser transceiver configured to emit the chirp signal received from the frequency modulator.

5. The LiDAR system of claim 4, wherein the laser assembly comprises:
an optical circulator that optically couples the frequency modulator to the laser transceiver and the fiber optic ending to the laser frequency detector.

6. The LiDAR system of claim 5, wherein the optical circulator comprises an input port, a first output port, and a second output port, wherein the first output port is optically coupled to the laser transceiver and the second output port is optically coupled to the laser frequency detector.

7. The LiDAR system of claim 2, wherein the frequency modulator comprises a local oscillator and the frequency modulator generates the chirp signal by mixing the pulse with frequency of the local oscillator.

8. The LiDAR system of claim 7, wherein the local oscillator is a voltage controlled local oscillator.

9. The LiDAR system of claim 2, wherein the profile of the chirp signal is determined based on the frequency of the diverted portion of the chirp signal detected by the laser frequency detector.

10. The LiDAR system of claim 1, wherein the one or more processors are further configured to linearize the chirp signal based on the profile and determine the range of the object based on the linearized chirp signal.

11. A method for linearizing an non-linear chirp signal of a light detection and ranging (LiDAR) system, the method comprising:
diverting a portion of the non-linear chirp signal to a fiber optic ending, wherein the non-linear chirp signal is to be emitted by the LiDAR sensor to detect an object in an environment;
receiving the portion of the non-linear chirp signal reflected from the fiber optic ending;
determining, by one or more processors, a profile of the non-linear chirp signal based on the portion of the non-linear chirp signal received from the fiber optic ending; and
determining, by one or more processors, a range of the object based on the profile of the chirp signal.

12. The method of claim 11, further comprising generating, by the frequency modulator, the nonlinear chirp signal based on a pulse from a laser source.

13. The method of claim 12, further comprising detecting, by a laser frequency detector, a frequency of the diverted portion of the chirp signal reflected from the fiber optic ending.

14. The method of claim 13, further comprising emitting, by a laser transceiver, the chirp signal received from the frequency modulator.

15. The method of claim 14, further comprising coupling, by an optical circulator, the frequency modulator to the laser transceiver and the fiber optic ending to the laser frequency detector.

16. The method of claim 15, wherein the optical circulator comprises an input port, a first output port, and a second output port, and the method further comprising:
optically coupling the first output port to the laser transceiver, and the second output port to the laser frequency detector.

17. The method of claim 12, wherein the frequency modulator comprises a local oscillator, and the method further comprising:
generating, by the frequency modulator, the chirp signal by mixing the pulse with frequency of the local oscillator.

18. The method of claim 17, wherein the local oscillator is a voltage controlled local oscillator.

19. The method of claim 12, wherein the profile of the chirp signal is determined based on the frequency of the diverted portion of the chirp signal detected by the laser frequency detector.

20. The method of claim 11, further comprising:
linearizing the chirp signal based on the profile and determining the range of the object based on the linearized chirp signal.

* * * * *